United States Patent
Wada et al.

(10) Patent No.: US 6,423,422 B2
(45) Date of Patent: Jul. 23, 2002

(54) HIGH STRENGTH SPONGY SINTERED METAL COMPOSITE SHEET AND PRODUCTION METHOD THEREOF

(75) Inventors: Masahiro Wada; Yoshitaka Mayuzumi; Koji Hoshino; Saburou Wakita, all of Omiya (JP)

(73) Assignee: Mitsubishi Materials Corporation, Omiya (JP)

( * ) Notice: Subject to any disclaimer, the term of this patent is extended or adjusted under 35 U.S.C. 154(b) by 0 days.

(21) Appl. No.: 09/288,286

(22) Filed: Apr. 8, 1999

(30) Foreign Application Priority Data

Apr. 8, 1998 (JP) .............................. 10-095870
Feb. 24, 1999 (JP) ........................... 11-046564

(51) Int. Cl.[7] .............................. B32B 3/24; B32B 3/26; B32B 7/04; H01M 4/80; B22F 7/02

(52) U.S. Cl. ..................... 428/550; 428/566; 428/613; 428/636; 428/316.6; 428/539.5; 419/8; 419/26; 419/38

(58) Field of Search ................ 428/550, 553, 428/554, 566, 613, 636, 316.6, 539.5; 419/8, 26, 38

(56) References Cited

U.S. PATENT DOCUMENTS

| | | | |
|---|---|---|---|
| 4,251,603 A | | 2/1981 | Matsumoto et al. |
| 4,977,038 A | * | 12/1990 | Sieradzkie et al. |
| 5,523,183 A | * | 6/1996 | Koehler et al. |
| 5,589,301 A | | 12/1996 | Edgington et al. |
| 5,698,800 A | * | 12/1997 | Hoshino et al. |
| 5,722,134 A | | 3/1998 | Edgington et al. |
| 5,795,680 A | * | 8/1998 | Ikeda et al. |
| 5,848,351 A | * | 12/1998 | Hoshino et al. |
| 5,850,591 A | * | 12/1998 | Sugikawa |
| 6,117,592 A | * | 9/2000 | Hoshino et al. |

FOREIGN PATENT DOCUMENTS

| | | |
|---|---|---|
| EP | 0 803 923 A | 10/1997 |
| GB | 2 176 500 A | 12/1986 |

* cited by examiner

Primary Examiner—Deborah Jones
Assistant Examiner—Jason Savage
(74) Attorney, Agent, or Firm—Oblon, Spivak, McClelland, Maier & Neustadt, P.C.

(57) ABSTRACT

A high strength spongy sintered metal composite sheet comprising a porous spongy sintered metal layer having continuous holes, and a high strength sintered, dense metal reinforcing layer having a porosity smaller than the porosity of the spongy sintered metal layer, laminated thereon, wherein the sintered, dense metal reinforcing layer has a thickness of 0.5–30% thickness with respect to the entire high strength spongy sintered metal composite sheet.

13 Claims, 9 Drawing Sheets

HIGH STRENGTH SPONGY SINTERED METAL COMPOSITE SHEET AND PRODUCTION METHOD THEREOF

BACKGROUND OF THE INVENTION

1. Field of the Invention

The present invention relates to a high strength spongy baked metal composite sheet and to a method for production of the sheet. The high strength spongy baked metal composite sheet is used as a material for producing a filter for high temperature applications, a filter for air cleaners, and an electrode substrate for secondary alkaline batteries. It is particularly useful as a material for the production of an electrode substrate of secondary alkaline batteries.

2. Description of the Background

In general, the electrode substrates of secondary alkaline batteries are prepared from spongy baked metal sheets which have holes which are open on the surfaces of the sheets. These holes are continuous with internal holes (hereinafter referred to as continuous holes), and the sheets thereby have a volume porosity of 70–99%. Furthermore, recently, the electrode substrates of a secondary alkaline batteries have been prepared from spongy baked metal sheets which have a structure including a skeleton part which comprises a baked sintered metal having continuous holes and extremely fine continuous holes in comparison to normal continuous holes (hereinafter referred to as skeleton fine holes). Preferably the continuous holes have an average hole size of 100–700 $\mu$m, the skeleton part has an average skeleton fine hole size of 0.5–20 $\mu$m and a porosity of 10–55%, and the spongy baked metal sheet as a whole has a porosity of 90–99%.

For the production of the spongy baked metal sheet, in general, the apparatus shown in the cross-sectional diagram thereof in FIG. 12 is used. In FIG. 12, numeral 6 denotes a carrier sheet, 7 a doctor blade, 8 a foaming slurry, 9 a high temperature high humidity vessel, 11 a drying vessel, 12 a hopper, 13 an unwinding reel, 14 a winding reel, and 15, 16 supporting rolls.

The foaming slurry 8, prepared by adding a surfactant and a foaming agent to a slurry made from material powders and a thinner, is stored in hopper 12. As shown in FIG. 12, the foaming slurry 8 is formed as a thin sheet on the carrier sheet 6 by the doctor blade 7. It is foamed to a sponge-like state utilizing the vapor pressure of a volatile organic solvent and the foamability of the surfactant present in the above-mentioned foaming slurry in the high temperature, high humidity vessel 9. It is further dried in the drying vessel 11 so as to produce a spongy green sheet 10'. The spongy green sheet 10' is degreased and baked in a degreasing device and a baking furnace (not illustrated) so as to produce a spongy baked metal sheet having continuous holes.

In order to strengthen the spongy baked metal sheet which has been produced, in general, the sheet is integrated with a reinforcing layer of a metal layer having ordinary punched holes, a metal mesh, or a plurality of fine metal layers by resistance welding.

However, in order to integrate the spongy baked metal sheet with the metal tape having the punched holes or the metal mesh by resistance welding, at least two steps are required which include the step of preparing the spongy baked metal sheet and the step of resistance welding the spongy baked metal sheet to the metal tape, the metal mesh, or the like. These two steps increase the production costs, and thus it is not preferred method, Moreover, a problem is involved in that at the time of the resistance welding of the spongy baked metal sheet and the metal tape, the metal mesh, or the like, the holes of the spongy baked metal sheet are crushed by an electrode roll employed in the process so that the porosity of the spongy baked metal sheet is lowered.

Another method of producing a high strength spongy baked metal composite sheet involves preparing a thin sheet from a foamed slurry on a metal tape having punched holes or a metal mesh by the doctor blade method, preparing a spongy green sheet having continuous holes by foaming a foaming slurry utilizing the vapor pressure of a volatile organic solvent and the foamability of the surfactant present therein in the constant temperature, high humidity vessel, and degreasing and sintering the spongy green sheet in order to laminate a spongy baked metal sheet having continuous holes on the metal tape having the punched holes or the metal mesh. However, a high strength spongy baked metal composite sheet produced by this method possesses the problem that because the contraction ratio of the spongy green sheet at the time of degreasing and sintering is very large in comparison to the contraction ratio of the metal tape or the metal mesh to which it is bonded with the result that the integrated sheet becomes curved toward the spongy baked metal layer side or cracks are generated in the spongy baked metal layer.

Furthermore, when the integrated sheet is used as an electrode substrate of a secondary alkaline battery, the spongy baked metal layer of a high strength spongy baked metal composite sheet is impregnated with an active material and is rolled with a roll. At that time, the joint which is formed between the spongy baked metal layer and the metal tape may be insufficient thereby causing the spongy baked metal layer to peel from the metal tape.

SUMMARY OF THE INVENTION

Accordingly, one object of the present invention is to provide a composite green sheet prepared from a spongy metal layer and a high strength metal reinforcing layer, which does not result in curvature of the sintered product which is prepared.

Briefly, this object and other objects of the present invention as hereinafter will become more readily apparent can be attained by a high strength, spongy sintered metal composite sheet, comprising a porous, spongy sintered metal layer having continuous holes which are open to the surface of the layer and which are continuous with internal holes of the metal layer, and a high strength, sintered dense metal reinforcing layer having a porosity less than the porosity of the spongy, sintered metal layer, laminated thereon.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
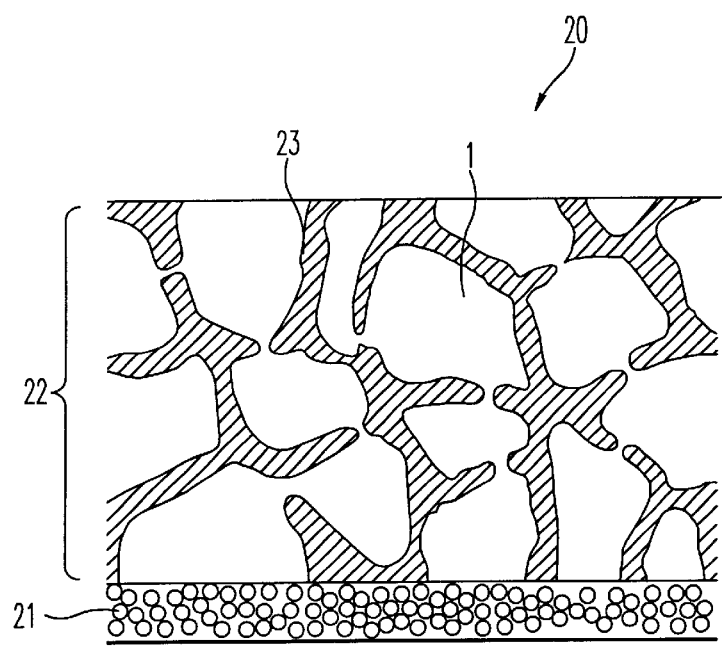
FIG. 1 is a cross-sectional enlarged diagram of a high strength spongy sintered metal composite sheet.

The objective of the invention, as noted above, has now been achieved by a process in which a composite green sheet is prepared by degreasing and sintering a dense reinforcing green layer and a spongy green layer produced by extending a slurry comprising a mixture of material powders and a thinner, or a mixture of material powders, a thinner and a surfactant on a carrier sheet by the doctor blade method, heating and drying the same to form a green layer, which is to be sintered to a dense metal reinforcing layer (hereinafter referred to as a dense reinforcing green layer), extending a slurry prepared by mixing material powders, a thinner, a surfactant and a foaming agent (hereinafter referred to as a foaming slurry) on the prepared dense reinforcing green layer by the doctor blade method, and heating and drying the same to form a green layer, which is to be sintered to a spongy metal layer (hereinafter referred to as a spongy green layer), on the above-mentioned dense reinforcing green layer. A high strength spongy, sintered metal composite sheet is prepared which comprises a spongy, sintered metal layer having a high porosity with continuous holes opened on the surface and continuous with internal holes (hereinafter referred to as continuous holes), and a sintered metal dense reinforcing layer having a porosity less than the porosity of the spongy, sintered metal layer, but which is denser than the spongy, sintered metal layer the two metal layers laminated on each other in high strength. The spongy, sintered metal composite sheet does not curve in its preparation during the decreasing and sintering steps, nor are cracks generated in the spongy, sintered metal layer. Moreover, a spongy, sintered metal composite sheet of a high strength and of a high porosity can be obtained with one series of degreasing and sintering. Furthermore, the risk of peeling of the layers in the production of an electrode substrate of a secondary alkaline battery can be prevented.

The present invention has been secured in the above-mentioned findings, wherein the first aspect of the invention is a high strength, spongy, sintered metal composite sheet comprising a spongy, sintered metal layer having continuous holes with a high porosity, and a high strength, dense, sintered metal reinforcing layer having a porosity less than the porosity of the spongy, sintered metal layer, laminated thereon.

Preferably the sintered, dense metal reinforcing layer of the high strength, spongy sintered metal composite sheet of the present invention has a thickness of 0.5–30%, preferably 1–5%, with respect to the thickness of the entire high strength, spongy sintered metal composite sheet. If the thickness of the sintered, dense metal reinforcing layer is less than 0.5%, a sufficient strength cannot be achieved, since the thickness of the sintered, dense metal reinforcing layer is too thin. On the other hand, if the thickness of the sintered, dense metal reinforcing layer is more than 30%, even if a sufficient strength can be obtained, in the instance the reinforcing layer is used as an electrode substrate for a secondary alkaline battery, the battery can not be sufficiently filled with active material, and thus such a thickness is not preferred. Accordingly, the thickness of the sintered, dense metal reinforcing layer of the present invention is set as 0.5–30%, preferably 1–5% with respect to the thickness of the entire high strength, spongy sintered metal composite sheet.

Accordingly, a second aspect of the present invention is a high strength, spongy sintered metal composite sheet comprising a highly porous, spongy sintered metal layer having continuous holes, and a high strength, sintered dense metal reinforcing layer having a porosity less than the porosity of the spongy sintered metal layer, laminated thereon, wherein the sintered, dense metal reinforcing layer has a thickness of 0.5–30% with respect to the entire high strength, spongy sintered metal composite sheet.

Furthermore, although a spongy sintered metal layer with a high porosity, having continuous holes, which is a component of the high strength spongy sintered metal composite sheet of the present invention, has a 70–99% by volume porosity, which is the same as the porosity of an ordinary spongy sintered metal layer, since the sintered, dense metal reinforcing layer, which is also a component of the high strength spongy sintered metal composite sheet of the present invention, has continuous holes which are smaller than the above-mentioned continuous holes opened on the surface and continuous with internal holes (hereinafter referred to as continuous fine holes) and a porosity smaller than the porosity of the spongy sintered metal layer, a high strength and a highly electrically conductive product can be prepared.

The dense, sintered metal reinforcing layer preferably has a porosity of 4–55% by volume, preferably 20–40% by volume. By providing punched holes in the high strength spongy sintered metal composite sheet of the prevent invention, a further dense sintered metal reinforcing layer having a porosity of less than 4% by volume can be formed. Furthermore, a dense, sintered metal reinforcing layer having a porosity of 0% by volume without holes can be formed. Even if a dense, sintered metal reinforcing layer having a porosity of less than 4% by volume or without holes is laminated onto the spongy sintered metal layer by sintering, the shrinkage during the sintering step is not much different from shrinkage in sintering the spongy sintered metal layer, and thus there is no risk of curvature or generation of cracks in the spongy sintered metal layer.

Accordingly, a third aspect of the present invention is a high strength, spongy sintered metal composite sheet comprising a spongy sintered metal layer having continuous holes with a high porosity, and a dense, sintered metal reinforcing layer having a porosity of 0–55% by volume which is less than the porosity of the spongy sintered metal layer, laminated thereon.

A fourth aspect of tine present invention is a high strength spongy sintered metal composite sheet comprising a spongy sintered metal layer having continuous holes with a high porosity, and a high strength, dense, sintered metal reinforcing layer having a porosity of 0–55% by volume which is less than the porosity of the spongy sintered metal layer, laminated thereon, wherein the sintered, dense metal reinforcing layer has a thickness of 0.5–30% with respect to the entire high strength spongy sintered metal composite sheet.

A fifth aspect of the present invention is a high strength spongy sintered metal composite sheet comprising a highly porous, spongy sintered metal layer having continuous holes, and a high strength sintered, dense metal reinforcing layer having continuous fine holes with a porosity of 4–55% by volume which is less than the porosity of the spongy sintered metal layer, laminated thereon.

A sixth aspect of the present invention in a high strength spongy sintered metal composite sheet comprising a highly porous, spongy sintered metal layer having continuous holes, and a high strength, dense, sintered metal reinforcing layer having continuous fine holes with a porosity of 4–55% by volume which is less than the porosity of the spongy sintered metal layer, laminated thereon, wherein the sintered metal dense reinforcing layer has a thickness of 0.5–30% with respect to the entire high strength spongy sintered metal composite sheet.

A seventh aspect of the present invention is a high strength spongy sintered metal composite sheet comprising a highly porous spongy sintered metal layer having continuous holes, and a high strength, dense, sintered metal reinforcing layer having a porosity of less than 4% by volume or without holes, laminated thereon.

An eighth aspect of the present invention is a high strength spongy sintered metal composite sheet comprising a highly porous spongy sintered metal layer having continuous holes and a high strength, dense, sintered metal reinforcing layer having a porosity of less than 4% by volume or without holes, laminated thereon, wherein the sintered, dense metal reinforcing layer has a thickness of 0.5–30% with respect to the entire high strength spongy sintered metal composite sheet.

Furthermore, since the sintered, dense metal reinforcing layer is produced without a step of a large draft, such as rolling, the continuous fine holes present in the sintered, dense metal reinforcing layer can be distributed three-dimensionally and homogeneously without being crushed in the thickness direction. Accordingly, since the sintered, dense metal reinforcing layer has an isotropic mechanical strength and is electrically conductive, high strength and high electric conductivity can also be provided in the thickness direction.

Accordingly, a ninth aspect of the present invention is a high strength spongy sintered metal composite sheet, wherein the sintered, dense metal reinforcing layer has homogeneously distributed, three-dimensionally amorphous holes which can be observed by an electron microscope with a 1,000 times magnification.

A high strength spongy sintered metal composite sheet of the present invention, having a high strength, dense, sintered metal reinforcing layer, as a laminated component, will be explained in further detail with reference to the accompanied drawings.

FIG. 1 is a cross-sectional enlarged diagram of a high strength spongy sintered metal composite sheet 20 of the present invention, comprising a highly porous, spongy sintered metal layer 22 having continuous holes 1 laminated on one side of a sintered, dense metal reinforcing layer 21 having a porosity of 4–55% by volume.

Figure 2:
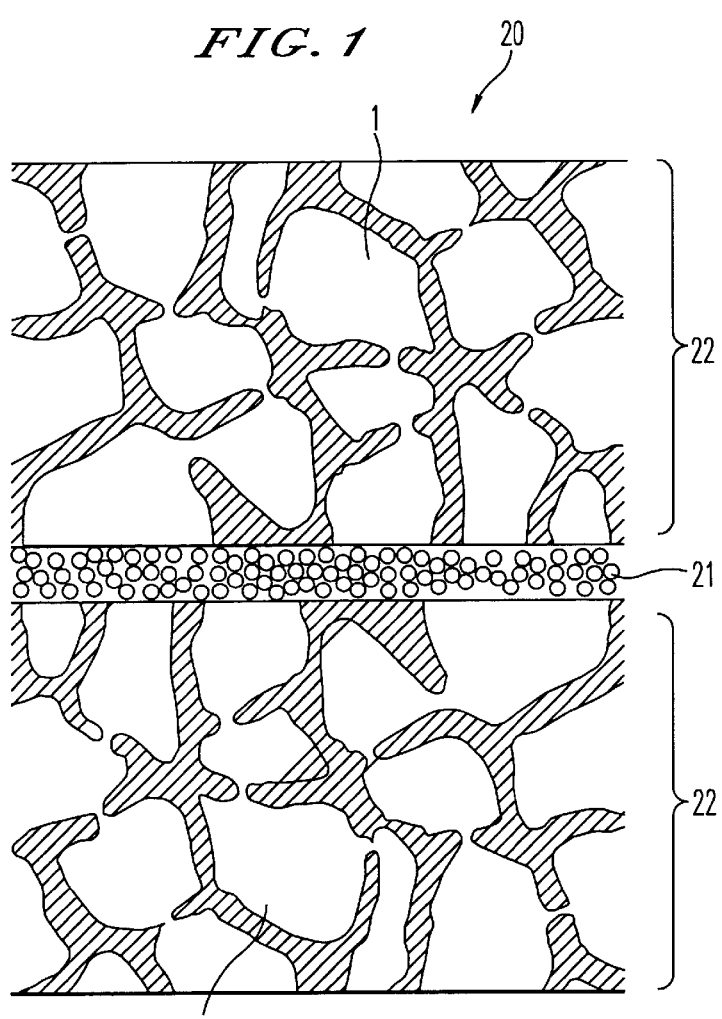
FIG. 2 is a cross-sectional enlarged diagram of a high strength spongy sintered metal composite sheet.

FIG. 2 is a cross-sectional enlarged diagram of a high strength spongy sintered metal composite sheet 20 of the present invention, comprising a highly porous spongy sintered metal layer 22 having continuous holes 1 laminated on both sides of a sintered, dense metal reinforcing layer 21 having a porosity of 4–55% by volume.

The spongy sintered metal layer 22, in general, comprises continuous holes 1 and a skeleton part 23 with a porosity of 70–99%, which is a known value. In laminating the above-mentioned high strength, dense, sintered metal reinforcing layer having a porosity of 4–55% by volume on the spongy sintered metal layer 22, the spongy sintered metal layer 22 is laminated on one side or both sides of the sintered, dense metal reinforcing layer 21. In the high strength spongy sintered metal composite sheets 20 of the present invention comprising the above-mentioned sintered, dense metal reinforcing layer 21 and the above-mentioned known spongy sintered metal layer 22 shown in FIGS. 1 and 2, the sintered, dense metal reinforcing layer 21 has a thickness of 0.5–30% with respect to the thickness of the entire high strength spongy sintered metal composite sheet 20 in either case.

Figure 3:
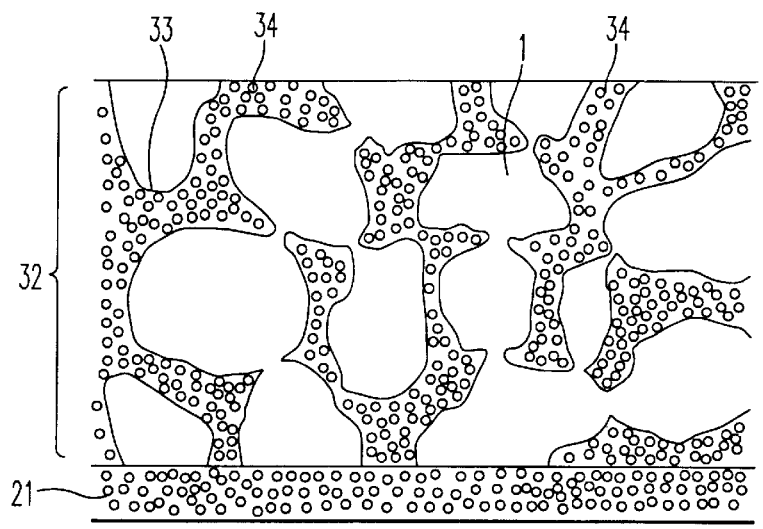
FIG. 3 is a cross-sectional enlarged diagram of a high strength spongy sintered metal composite sheet.

FIG. 3 is a cross-sectional enlarged diagram of a high strength spongy sintered metal composite sheet 20 of the present invention, comprising a highly porous spongy sintered metal layer 32 having continuous holes 1 laminated on one side of a sintered, dense metal reinforcing layer 21 having a porosity of 4–55% by volume.

Figure 4:
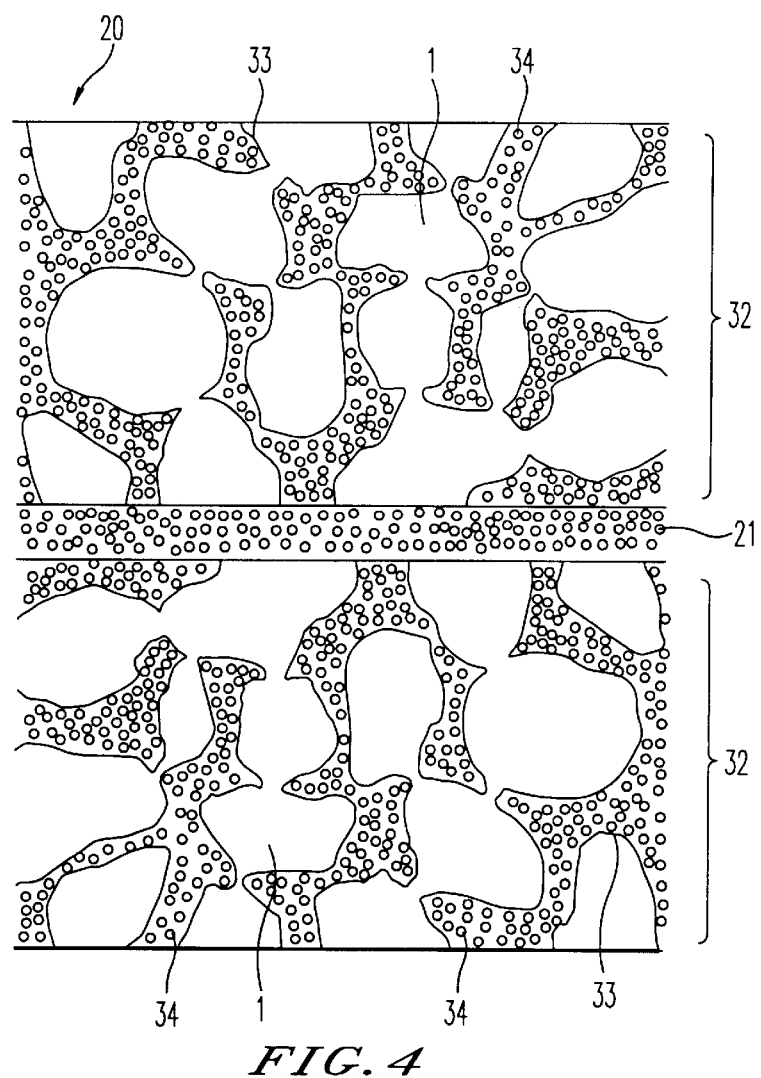
FIG. 4 is a cross-sectional enlarged diagram of a high strength spongy sintered metal composite sheet.

FIG. 4 is a cross-sectional enlarged diagram of a high strength spongy sintered metal composite sheet 20 of the present invention, comprising a highly porous, spongy sintered metal layer 32 having continuous holes 1 laminated on both sides of a sintered, dense metal reinforcing layer 21 having a porosity of 4–55% by volume.

The highly porous, spongy sintered metal layer 32 having continuous holes 1 to be laminated on one side or both sides of the sintered, dense metal reinforcing layer 21 shown in FIGS. 3 and 4 comprises continuous holes 1 and a skeleton part 33. The skeleton part 33 includes skeleton fine holes 34, with an entire porosity of 70–99%. The high porosity spongy sintered metal layer is commonly known. It is also known that the above-mentioned continuous holes 1 have a average hole size of 100–700 $\mu$m, the skeleton fine holes 34 of the skeleton part 33 have an average hole size 0.5–20 $\mu$m with a porosity of 50–55%, and the entirety of the spongy sintered metal layer 32 has a porosity of 90–98%. In the high strength spongy sintered metal composite sheets 20 of the present invention comprising the abovementioned sintered, dense metal reinforcing layer 21 and the above-mentioned known spongy sintered metal layer 22 shown in FIGS. 3 and 4, the sintered, dense metal reinforcing layer 21 has a thickness of 0.5–30% with respect to the thickness of the entire high strength spongy sintered metal composite sheet 20 in either case. Moreover, preferably the high strength, sintered, dense metal reinforcing layer 21 has a porosity of 4–55% by volume and an average hole size of 1–100 $\mu$m.

Figure 5:
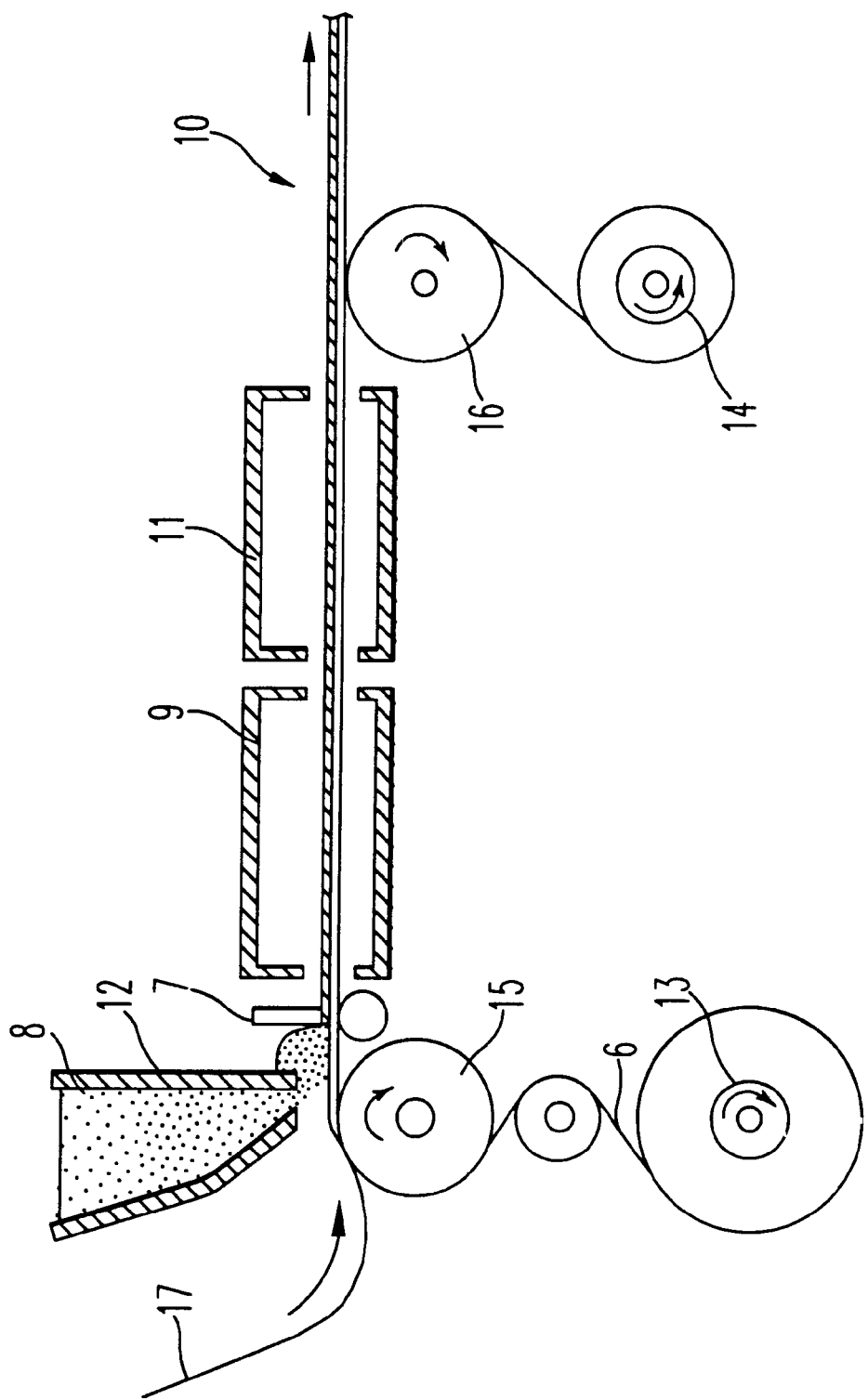
FIG. 5 is a cross-sectional diagram of a device for producing a composite green sheet having a dense reinforcing green layer to be used in the production of a high strength spongy sintered metal composite sheet of the present invention.

In producing the high strength, spongy sintered metal composite sheets 20 of the present invention shown in FIGS. 1–4, as shown in FIG. 5, a preliminarily produced dense reinforcing green tape 17 is applied to a carrier sheet 6. While supplying a foaming slurry 8 onto the above-mentioned carrier sheet 6 with the dense reinforcing green tape 17 placed thereon, the foaming slurry 8 is applied as a thin sheet onto the above-mentioned dense reinforcing green tape 17. It is formed like a sponge in the high temperature, high humidity vessel 9, utilizing the vapor pressure of a volatile organic solvent and the foamability of the surfactant contained in the above-mentioned foaming slurry 8. Furthermore, the applied slurry is dried in a drying vessel 11 so as to produce a composite green sheet 10 comprising a dense reinforcing green layer and a spongy green layer. By degreasing and sintering the composite green sheet 10, while passing through a degreasing furnace and a sintering furnace (not illustrated), a high strength spongy sintered metal composite sheet 20 of the present invention can be produced.

In FIG. 5. numeral 7 denotes a doctor blade, 9 a high temperature, high humidity vessel, 11 a drying vessel, 12 a hopper, 13 an unwinding reel, 14 a winding reel, and 15, 16 supporting rolls. Since the numerals are the same as those of FIG. 12, the functions of these component parts will not be explained here. By degreasing and sintering the composite green sheet comprising the dense reinforcing green layer and the spongy green layer, the high strength spongy sintered metal composite sheet 20 of the present invention comprising the spongy sintered metal layer 22 and the high strength sintered metal dense reinforcing layer 21 with a porosity of 4–55% by volume shown in FIGS. 1 and 3 can be produced.

Figure 6:
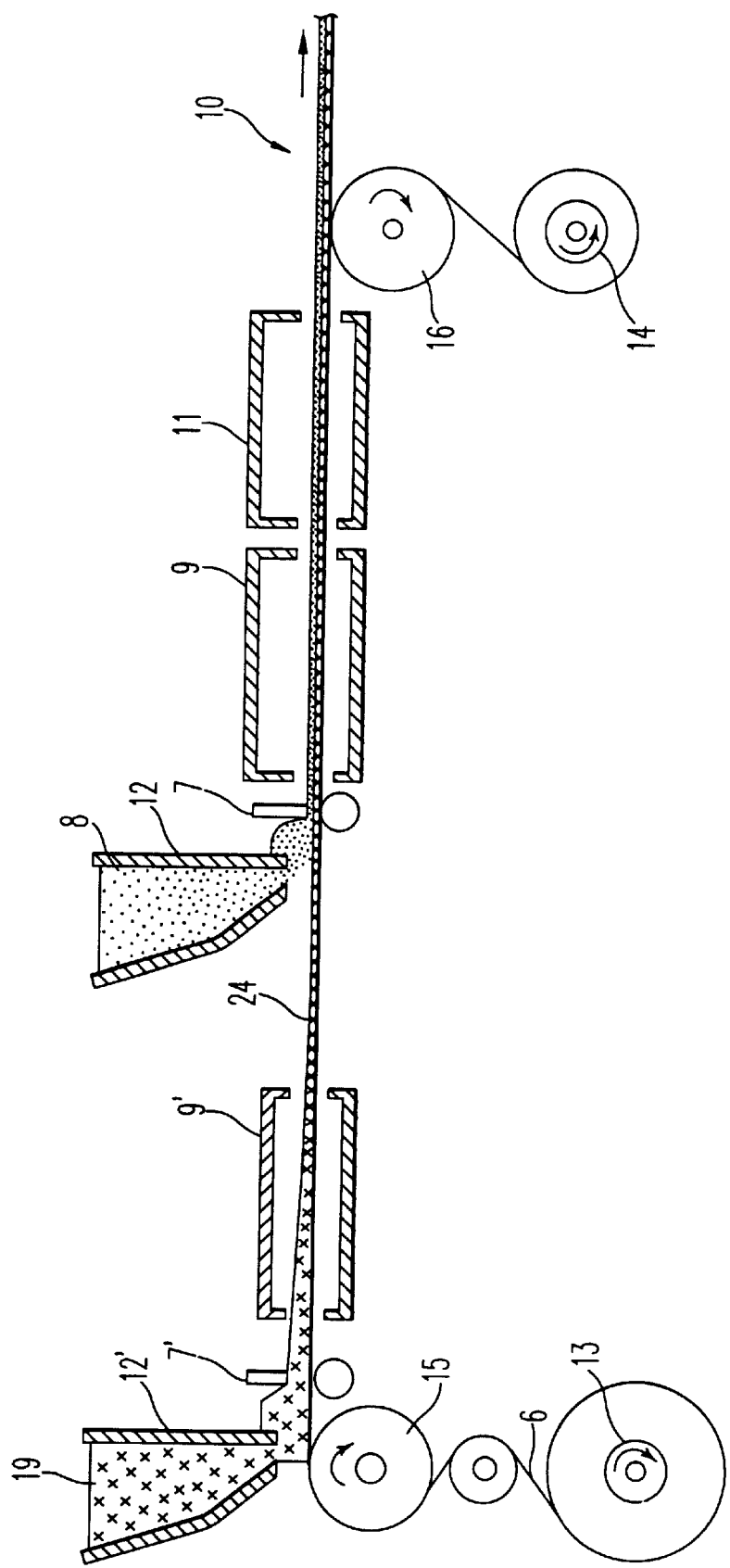
FIG. 6 is a cross-sectional diagram of a device for producing a composite green sheet having a dense reinforcing green layer to be used in the production of a high strength spongy sintered metal composite sheet of the present invention.

Although the dense reinforcing green tape 17 preliminarily produced is supplied in the case of FIG. 5, the high strength spongy sintered metal composite sheet 20 as shown in FIGS. 1 and 3 can also be produced by the method shown in FIG 6. That is, a dense reinforcing layer forming slurry 19 stored in a hopper 12' is supplied onto a carrier sheet 6. Then, a dense reinforcing slurry layer 24 is formed on the carrier sheet 6 by extending the dense reinforcing layer forming slurry thinly by a doctor blade 7'. By passing the dense reinforcing slurry layer 24 through a constant temperature, high humidity vessel 9', the surface is lightly greened. Then, by supplying a foaming slurry 8 onto the dense reinforcing slurry layer 24 with the surface lightly greened so as to form a foaming slurry layer and passing it through a high temperature, high humidity vessel and a drying vessel 11, a composite green sheet 10 comprising a dense reinforcing green layer and a spongy green layer is produced. Then, the composite green sheet passes through a degreasing furnace and a sintering furnance (not illustrated) for degreasing and sintering, respectively. The above-mentioned high temperature, high humidity vessel 9' is provided for lightly greening the surface of the dense reinforcing slurry layer 24 so as not to mix the dense reinforcing layer forming slurry 19 and the foaming slurry 8 in the production of the composite green sheet.

Furthermore, the present invention is a high strength spongy sintered metal composite sheet with a high strength, dense, sintered metal reinforcing layer having a less than 4% by volume porosity or without holes, which is laminated. Since the high strength, dense, sintered metal reinforcing layer having a porosity of less than 4% by volume or without holes does not have a sufficient ventilation, a sintered, dense metal reinforcing layer with a plurality of punched holes, a mesh-like sintered, dense metal reinforcing layer, or sintered, dense metal reinforcing layers arranged parallel to each other with an interval need to be laminated.

A high strength spongy sintered metal composite sheet with a high strength, dense, sintered metal reinforcing layer having a porosity of less than 4% by volume or without holes of the present invention will be explained in detail with reference to the accompanying drawings.

Figure 7:
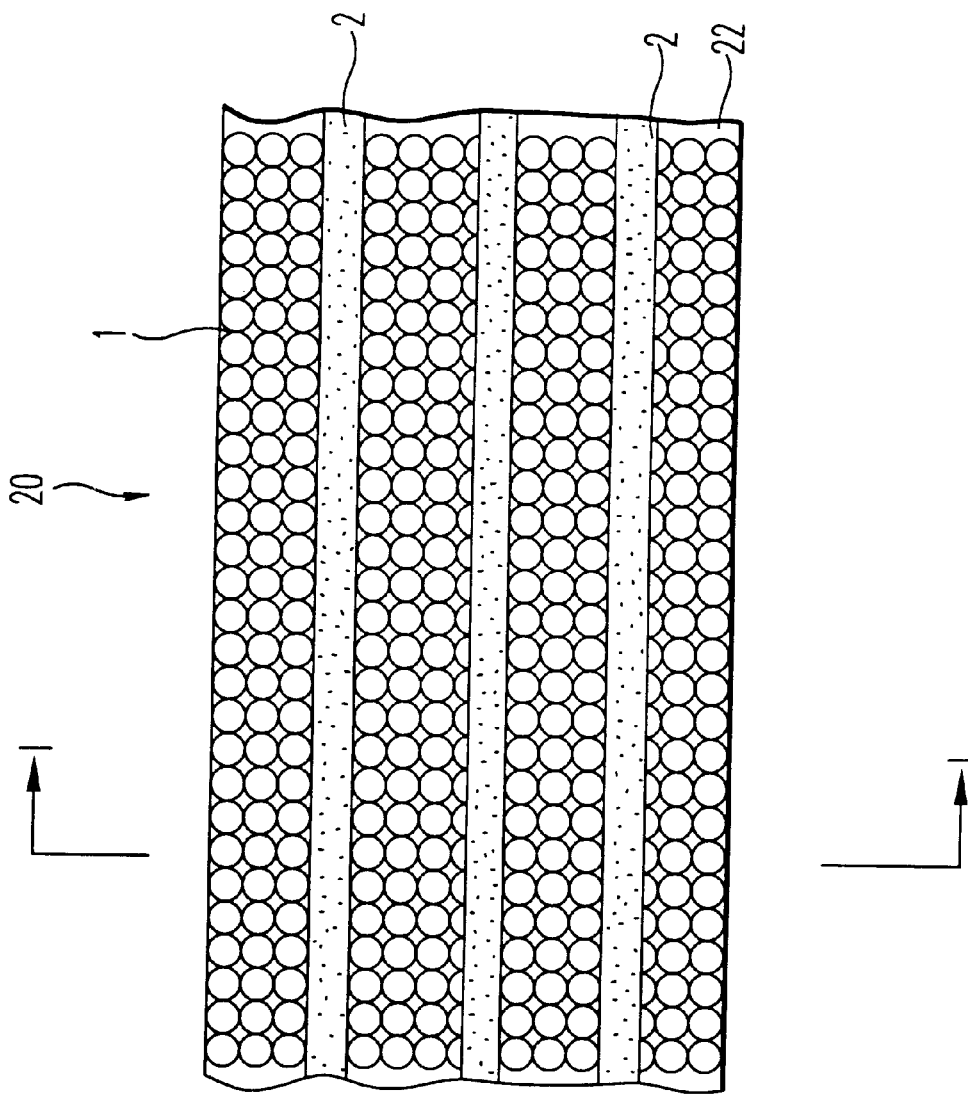
FIG. 7 is a plan schematic diagram of a high strength spongy sintered metal composite sheet of the present invention.
Figure 8:
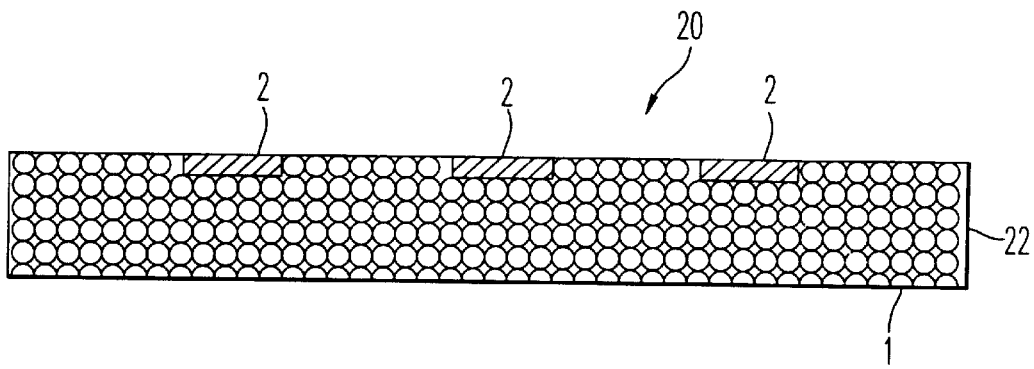
FIG. 8 is a cross-sectional view taken on the line I—I of FIG. 7.

FIG. 7 is a plan diagram which shows a high strength spongy sintered metal composite sheet 20 with high strength, sintered, dense metal reinforcing layers having a porosity of less than 4% by volume or without holes according to the present invention, and FIG. 8 is a cross-sectional view taken on the line I—I of FIG. 7. In FIGS. 7 and 8, numeral 1 denotes continuous holes and 2 high strength, sintered, dense metal dense reinforcing layers with a porosity of less than 4% or without holes. As shown in FIGS. 7 and 8, in the high strength, spongy sintered metal composite sheet 20 having the sintered, dense metal reinforcing layers 2, narrow band-like sintered, dense metal reinforcing layers 2 are formed with an interval on one side of the spongy sintered metal layer 22 in the direction parallel to the longitudinal direction of the spongy sintered metal layer 22. The high strength spongy sintered metal composite sheet 20 having the sintered, dense metal reinforcing layers 2 shown in FIGS. 7 and 8 can be cut into an appropriate shape for used as a filter in high temperature environments or as a filter for an air cleaner, or the like.

Figure 9:
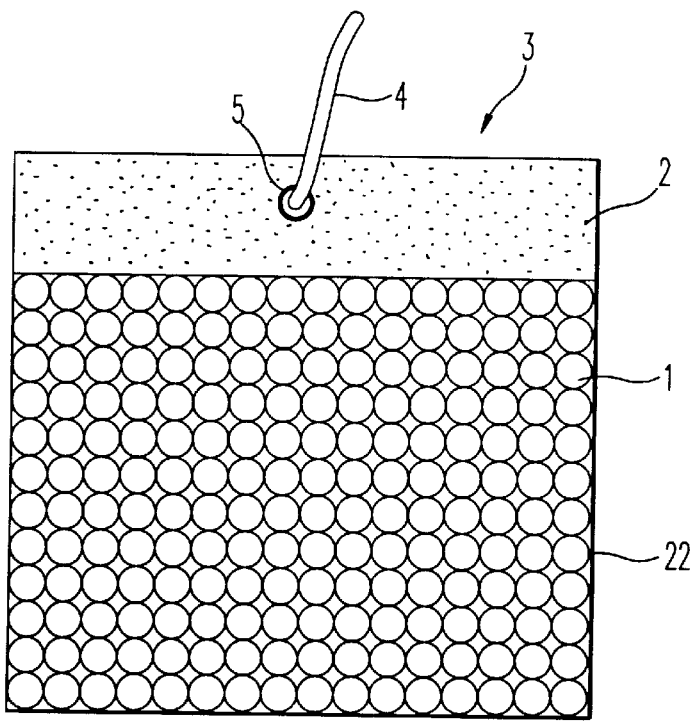
FIG. 9 is a plan view of an electrode substrate of a secondary alkaline battery produced from a high strength spongy sintered metal composite sheet of the present invention.

Moreover, as shown in FIG. 9, an electrode substrate 3 of a secondary alkaline battery can be produced by cutting the high strength spongy sintered metal composite sheet 20 shown in FIGS. 7 and 8 such that a part having the sintered, dense metal reinforcing layer 2 and a part having the continuous holes are paired. As shown in FIG. 9, since the sintered metal dense reinforcing layer 2 exists, the continuous holes 1 are not crushed even if a collector tab 4 is connected to the sintered, dense metal reinforcing layer 2 by welding 5, and thus the ratio occupied by the continuous holes 1 cannot be reduced and the amount of the active material contained in the entire electrode cannot be reduced by welding the collector tab.

As the sintered, dense metal reinforcing layer 2 to be formed on one side of the high strength spongy sintered metal composite sheet 20 of the present invention, the narrow band-like sintered, dense metal reinforcing layers 2 are formed with an interval parallel to each other in the longitudinal direction in the case of FIG. 7, but it can be lattice-like, mesh-like (not illustrated) or another optional shape, and thus it is not limited to the shapes shown in FIGS. 7–9.

Figure 10:
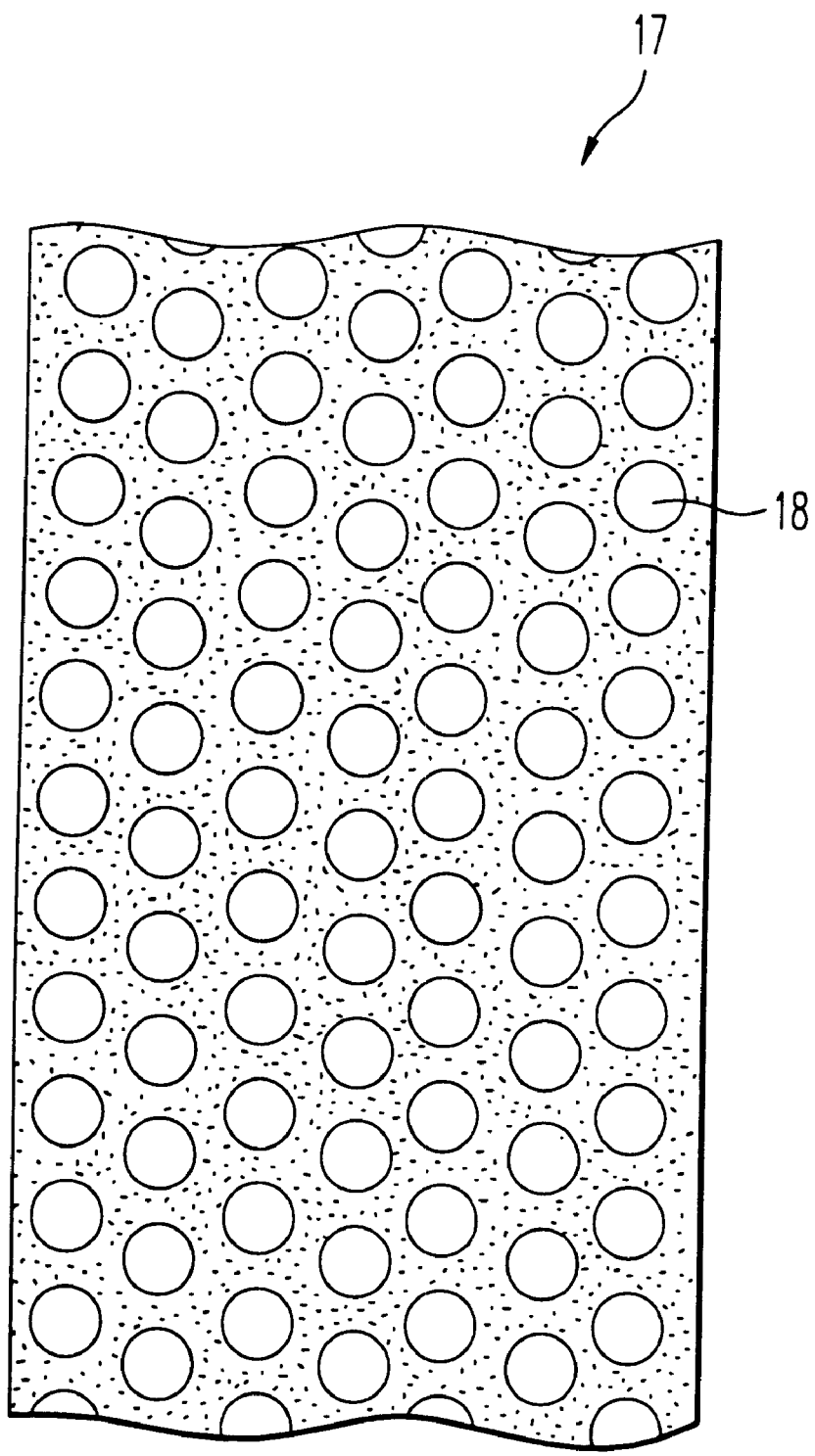
FIG. 10 is a plan view of a dense reinforcing green tape having punched holes.
Figure 11A:
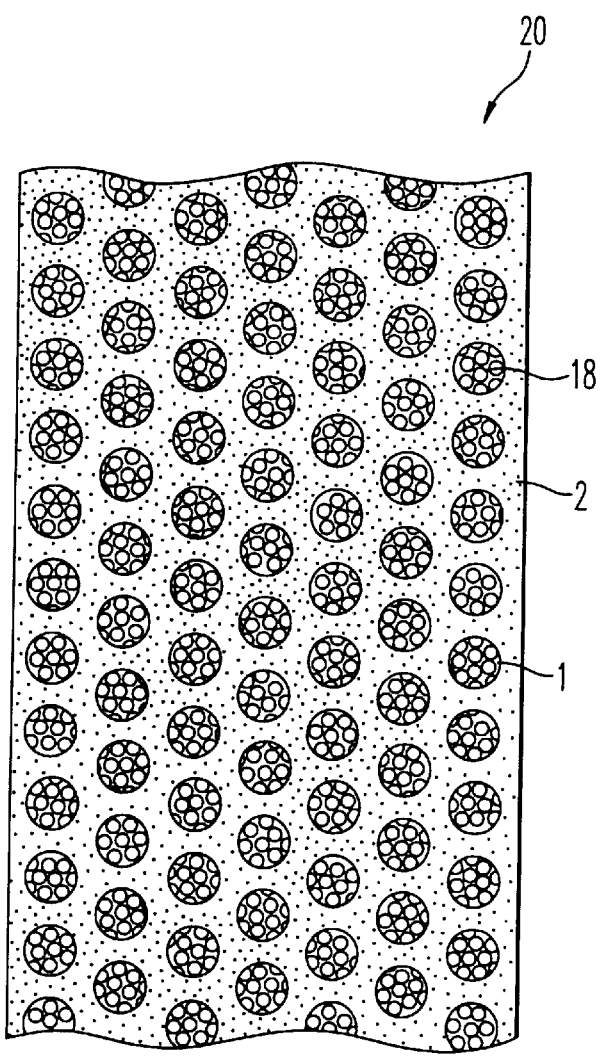
FIG. 11 is a plan schematic diagram of a high strength spongy sintered metal composite sheet of the present invention having a sintered, dense metal reinforcing layer provided with punched holes.
Figure 11B:
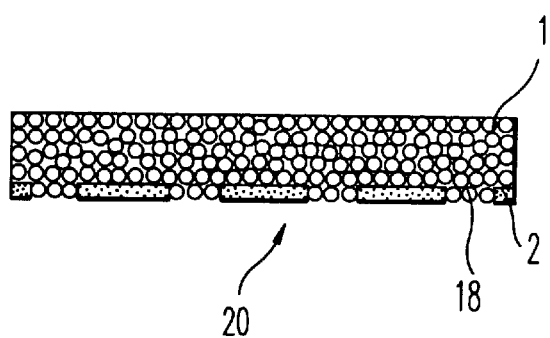

For example, a high strength, wide width dense reinforcing green tape 17 having punched holes 18, as shown in FIG. 10, is produced preliminarily. The dense reinforcing green tape 17 having the punched holes 18 is supplied so as to be placed onto a carrier sheet 6 as shown in the cross-sectional diagram of the explanation of FIG. 5. While supplying a foaming slurry 8 onto the dense reinforcing green tape 11 having the punched holes 18, the foaming slurry 8 is formed like a thin sheet on the dense reinforcing green tape 17 having the punched holes 18. It is formed like a sponge, utilizing the vapor pressure of a volatile organic solvent and the foamability of the surfactant present in the above-mentioned foaming slurry 8, followed by drying so as to produce a composite green sheet comprising a dense reinforcing green layer and a spongy green layer. By degreasing and sintering the composite green sheet while passing through a degreasing furnace and a sintering furnace (not illustrated), a high strength spongy sintered metal composite sheet 20 having the continuous holes 1, with one side provided with a sintered, dense metal reinforcing layer 2 having the punched holes 18 of the present invention as shown in a plan view of FIG. 11A and a cross-sectional view of FIG. 11B can be produced. The high strength spongy sintered metal composite sheet 20 accordingly obtained has the continuous holes 1 exposed from the punched holes 18 of the sintered, dense metal reinforcing layer 2 on the rear side of the high strength spongy sintered metal composite sheet 20 as shown in the plan view of FIG. 11A and the cross-sectional view of FIG. 11B.

The high strength spongy sintered metal composite sheet of the present invention is produced by the methods shown in FIGS. 5 and 6. Accordingly, a tenth aspect of the present invention is a method of producing a high strength spongy, sintered metal composite sheet comprising a step of forming a dense reinforced green layer, which is to become a sintered, dense metal reinforcing layer by extending a slurry comprising a mixture of material powders and a thinner or a mixture comprising material powders, a thinner and a surfactant onto a carrier sheet by the doctor blade method, and then heating and drying.

A second step of forming a spongy green layer, which is to become a spongy sintered metal layer on the dense reinforced green layer, is conducted by extending a foaming slurry prepared by mixing material powders, a thinner, a surfactant and a foaming agent onto the dense reinforcing green layer by the doctor blade method, and then heating and drying so as to produce a composite green sheet comprising the dense reinforcing green layer and the spongy green layer.

A final third step of degreasing and sintering the composite green sheet is then conducted.

In order to produce a high strength, spongy sintered metal composite sheet with a highly porous spongy sintered metal layers having continuous holes laminated on both sides of a sintered metal dense reinforcing layer having a porosity of 0–55% by volume, the above-mentioned foaming slurry is further applied on the dense reinforcing green layer of the composite green sheet produced in the above-mentioned tenth aspect by the doctor blade method, followed by drying so as to produce a composite green sheet with the spongy green layers formed on both sides of the dense reinforcing green layer. Then, by degreasing and sintering the composite green sheet, the product can be produced.

Accordingly, an eleventh aspect of the present invention is a method of producing a high strength spongy sintered metal composite sheet comprising a first step of extending the above-mentioned foaming slurry onto the surface of the dense reinforcing green layer side of the composite green sheet produced in the above-mentioned tenth aspect by the doctor blade method, drying the applied slurry so as to produce a composite green sheet with the spongy green layer formed on both sides of the dense reinforcing green layer, and then degreasing and sintering the composite green sheet.

Moreover, in order to produce a high strength spongy sintered metal composite sheet with spongy sintered metal layers having continuous holes with a high porosity laminated on both sides of a sintered metal dense reinforcing layer having a porosity of 0–55% by volume, a preliminarily produced spongy green layer is superimposed on and joined with the dense reinforcing green layer of the composite green sheet produced in the above-mentioned tenth aspect so as to produce a composite green sheet. Then, by degreasing and baking the composite green sheet, the product can be produced.

Accordingly, a twelfth aspect of the present invention is a method of producing a high strength spongy sintered metal composite sheet comprising a first step of superimposing and joining a preliminarily produced spongy green layer onto the surface of the dense reinforcing green layer side of the composite green sheet produced in the above-mentioned tenth aspect so as to produce a composite green sheet with the spongy green layer formed on both sides of the dense reinforcing green layer, and then degreasing and sintering the composite green sheet.

The high strength spongy sintered metal composite sheet of the above-mentioned first to ninth aspects can be used as a material for producing a filter for high temperature use, a filter for an air cleaner, and an electrode substrate of a secondary alkaline battery. In particular, it is preferably used as a material for producing an electrode substrate of a secondary alkaline battery.

Accordingly, a thirteenth aspect of the present invention is an electrode substrate of a secondary alkaline battery produced with the high strength spongy sintered metal composite sheet of the above-mentioned first to ninth aspects.

As the powdered materials for producing a high strength spongy sintered metal composite sheet of the present invention, Ni powders, Ni group alloy powders, Cu powders, Cu group alloy powders, Fe powders and Fe group alloy powders are preferably used, but other metal powders can be used as well, and thus the powders are not limited thereto.

Having now generally described the invention, a further understanding can be obtained by reference to certain specific Examples which are provided herein for purpose of illustration only and are not intended to be limiting unless otherwise specified.

EXAMPLES

Example 1

In the quantities shown in Table 1, a filler and a thinner were mixed and kneaded in a sealed container for 4 hours so as to produce a dense reinforcing layer forming slurry. Then, the slurry was stored in the hopper 12' shown in FIG. 6. Then, in the amounts shown in Table 2, a filler and a thinner were mixed and kneaded in a sealed container for 24 hours. A surfactant was added thereto in the amount shown in Table 2. The resulting substance was kneaded under a reduced pressure for 15 minutes. A foaming agent was added in the amount shown in Table 2. The substance was kneaded under atmospheric pressure for 5 minutes so as to prepare a foaming slurry. The obtained foaming slurry was stored in the hopper 12 shown in FIG. 6.

TABLE 1

| | |
|---|---|
| Filler | 54.7%, by weight of Ni powder having a 5 $\mu$m average particle size |
| Thinner | 4.6% by weight of hydroxypropyl methyl cellulose |
| | 4.5% by weight of glycerol |
| | 36.2% by weight of water |

TABLE 2

| | |
|---|---|
| Filler | 54.7% by weight of Ni powder having a 3 $\mu$m average particle size |
| Thinner | 3.79% by weight of hydroxypropyl methyl cellulose |
| | 3.6% by weight of glycerol |
| | 29.2% by weight of water |
| Surfactant | 7.3% by weight of sodium dodecylbenzene sulfonate |
| Foaming agent | 1.5% by weight of hexane |

A dense reinforcing layer forming slurry 19 shown in Table 1 was extended on carrier sheet 6 of FIG. 6 with a 0.1 mm blade gap so as to form a dense reinforcing slurry layer 24. By passing the slurry layer through the high temperature, high humidity vessel 9' in order to dry the deposited material at 30° C. for 2 minutes, the surface was lightly dried. The slurry 8, as described in Table 2, was supplied from the bottom of hopper 12, where the foaming slurry 8 was stored, with a 0.4 mm blade gap so as to produce a laminated slurry. The laminated slurry was supplied to the high temperature, high humidity vessel 9 of FIG. 6 for foaming at 40° C. temperature, 90% humidity and 20 minutes maintenance condition. The applied slurry was dried with hot air at 80° C. temperature and 15 minutes maintenance condition so as to produce a composite green sheet 10 comprising a dense reinforcing green layer and a spongy green layer.

While passing the composite green sheet through a degreasing furnace (not illustrated), it was degreased at 500° C. air temperature and 15 minutes maintenance condition.

The green sheet was sintered in an $N_2$-5%$H_2$ atmosphere under the conditions shown in Table 3, while passing the sheet through a sintering furnace (not illustrated) so as to produce high strength spongy sintered metal composite sheets 1–3, comprising a spongy sintered metal layer and a sintered, dense metal reinforcing layer described in Table 3 according to the present invention (hereinafter referred to as a composite sheet of the present invention).

A portion of the composite sheets of the present invention 1–3 accordingly obtained, was buried in a resin, upon which a polished cross-section was prepared for observation with an optical microscope with a 100 times magnification. Thereby, the porosity of the spongy sintered metal layer and the sintered, dense metal reinforcing layer, and the thickness ratio thereof were measured. Moreover, whether or not curvature is generated, and whether or not cracks are generated in the spongy sintered metal layer, were observed. The results are shown in Table 3. Furthermore, the composite sheet was cut into the JIS Z2201 (metal material tensile test piece) No.13A shape by an electric discharge machine in order to conduct a tensile test. Moreover, the sheet was cut into a 10 mm width and 200 mm length size on order to measure the specific resistance by the four-terminal method. The results are shown in Table 3.

Moreover, a paste-like active material was prepared by adding 1% by weight of carboxymethyl cellulose (CMC), 3% by weight of polytetrafluoroethylene (PTFE) and 30% by weight of pure water to a powdered mixture comprising 92% by weight of nickel hydroxide powders and 8% by weight of cobalt monoxide powders and then kneading the materials. The composite sheets of the present invention 1–3 were impregnated with the active material, dried at 100° C. for 3 hours, and rolled by 30% with a roll. The cross-section of the composite sheets of the present invention 1–3 after rolling was observed with an optical microscope in order to observe whether or not the spongy sintered metal layer had peeled and the sintered, dense metal reinforcing layer is generated. The results are shown in Table 3.

Conventional Example 1

The foaming slurry shown in Table 2 (Embodiment 1) was applied on the surface of a thin Ni sheet having a 60 μm thickness and having punched holes by the doctor blade method in order to produce a conventional composite sheet 1 with a spongy sintered metal layer formed on the surface of the Ni thin sheet provided with punched holes under the same conditions as in embodiment 1. The obtained conventional composite sheet 1 was measured and observed similarly as the sheet of embodiment 1. The results are shown in Table 3.

TABLE 4

| Filler | 54.7% by weight of Ni powder having 7 μm average particle size |
| --- | --- |
| Thinner | 38% by weight of hydroxymethyl propyl cellulose 3.7% by weight of glycerol 30.2% by weight of water |
| Surfactant | 7.6% by weight of sodium dodecylbenzene sulfonate |

TABLE 5

| Filler | 54.7% by weight of Ni powder having a 7 μm average particle size |
| --- | --- |
| Thinner | 3.7% by weight of hydroxymethyl propyl cellulose 3.6 by weight of glycerol 29.2% by weight of water |
| Surfactant | 7.3% by weight of sodium dodecylbenzene sulfonate |
| Foaming Agent | 1.5% by weight of hexane |

A dense reinforcing layer forming slurry 19 shown in Table 4 was extended on carrier sheet 6 of FIG. 6 with a blade gap shown in Table 6 in order to form a dense reinforcing slurry layer 24. By passing the slurry layer through the high temperature, high humidity vessel 9' for drying at 30° C. for 2 minutes, the surface was lightly dried. The slurry was supplied from the bottom of hopper 12, which stores the foaming slurry 8 shown in Table 6, for application of the foaming slurry with a blade gap shown in Table 6 so as to produce a laminated slurry. The laminated

TABLE 3

| Composite Sheet | Sintering Condition °C. | Sintering Condition min. | Porosity of the Spongy Sintered Metal Layer (% by Vol.) | Porosity of the Sintered Dense Metal Reinforcing Layer (% by Vol.) | Thickness Ratio of the Sintered metal Dense Reinforcing Layer with Respect to the Composite Sheet (%) | Tensile Strength (kgf/m²) | Specific Resistance × 10⁻⁶ (Ωm) | Whether or not Curvature is generated | Whether or not Cracks are generated | Whether or Not Peel Off is generated After Rolling |
| --- | --- | --- | --- | --- | --- | --- | --- | --- | --- | --- |
| Present Invention | | | | | | | | | | |
| 1 | 1050 | 100 | 97 | 4 | 2.5 | 2.9 | 1.2 | No | No | No |
| 2 | 1050 | 4 | 97 | 30 | 2.5 | 2.5 | 1.7 | No | No | No |
| 3 | 1050 | 2 | 97 | 55 | 2.5 | 1.8 | 3.0 | No | No | No |
| Conventional Sample | | | | | | | | | | |
| 1 | 1050 | 4 | 97 | — | 2.5 | Cannot be | | Yes | Yes | Yes |
| 2 | 1050 | 4 | 97 | — | — | 0.07 | 10.5 | No | No | — |

Conventional Example 2

A thinner and a surfactant were mixed with the foaming slurry shown in Table 2 and the mixture was kneaded in a sealed container for 4 hours in order to produce a dense reinforcing layer forming slurry. The slurry was stored in the hopper 12' shown in FIG. 6.

A filler and a thinner were mixed in the ratios shown in Table 5 and kneaded in a sealed container for 24 hours. A surfactant was added thereto in the amount shown in Table 5. The resulting substance was kneaded under a reduced pressure for 15 minutes. A foaming agent was added in the amount shown in Table 5. The kneaded material was kneaded under the atmospheric pressure for 5 minutes in order to prepare a foaming slurry. The obtained foaming slurry was stored in the hopper 12 shown in FIG. 6.

slurry was supplied to the high temperature, high humidity vessel 9 of FIG. 6 for foaming at 40° C., 90% humidity and 20 minutes maintenance condition. The slurry was dried with hot air at 80° C. and 15 minutes maintenance condition in order to produce a composite green sheet 10 comprising a dense reinforcing green layer and a spongy green layer.

By superimposing a preliminarily produced spongy green tape with a 1.5 mm thickness onto the composite green sheet comprising the dense reinforcing green layer and the spongy green layer accordingly obtained on the dense reinforcing green layer side of the composite green sheet, which combination was closely pressed with a roll at 50° C. and 90% humidity atmosphere for bonding, a composite green sheet having a spongy green layer on both sides of the dense reinforcing green layer was produced.

While passing the bonded composite green sheet through a degreasing furnace (not illustrated), the sheet was degreased at 500° C. air temperature and 15 minutes maintenance condition. Then, the sheet was sintered in a $N_2$-5%$H_2$ atmosphere at 1100° C. and 10 minutes maintenance condition, as it was passed through a sintering furnace (not illustrated) in order to produce composite sheets of the present invention 1–3, comprising a spongy sintered metal layer formed on both sides of a sintered, dense metal reinforcing layer shown in Table 6.

On the composite sheets of the present invention 4–6 accordingly obtained, as in Embodiment 1, the porosity of the spongy sintered metal layer and the sintered, dense metal reinforcing layer, and the thickness ratio thereof were measured. Moreover, whether or not curvature is generated, and whether or not cracks are generated in the spongy sintered metal layer, were observed. The results are shown in Table 6. Furthermore, the sheet was cut into the JIB Z2201 (metal material tensile test piece) No. 13A shape by an electric discharge machine in order to conduct a tensile test. Moreover, the sheet was cut into a 10 mm width and 200 mm length size in order to measure the specific resistance by the four terminal method. The results are shown in Table 6.

Furthermore, a paste-like active material was prepared by adding 1% by weight of carboxymethyl cellulose (CMC), 3% by weight of polytetrafluoroethylene (PTFE) and 30% by weight of pure water to a powdered mixture comprising 92% by weight of nickel hydroxide powders and B% by weight of cobalt monoxide powders, followed by kneading. The composite sheets of the present invention 4–6 were impregnated with the active material, dried at 100° C. for 3 hours, and rolled by 30% with a roll. The cross-section of the composite sheets of the present invention 4–6 after rolling was observed with an optical microscope in order to determine whether or not the spongy sintered metal layer had peeled from the sintered, dense metal reinforcing layer. The results are shown in Table 6.

Conventional Example 3

The foaming slurry shown in Table 5 of Embodiment 2 was applied on both sides of a thin Ni sheet having a 60 μm thickness and having punched holes by the doctor blade method in order to produce a conventional composite sheet 3 with a spongy sintered metal layer formed on both sides of the thin Ni sheet provided with punched holes under the same conditions as Embodiment 2. The obtained conventional composite sheet 3 was measured and observed similarly as the sheet of Embodiment 2. The results are shown in Table 6.

Conventional Example 4

With the foaming slurry shown in Table 5 of Embodiment 2, a spongy sintered metal sheet without a dense reinforcing layer was produced by the doctor blade method, The obtained sheet was measured and observed similarly as in Embodiment 2. The results are shown in Table 6.

TABLE 6

| Composite Sheet | Blade Gap of the Spongy Sintered Metal Layer (mm) | Blade Gap of the Sintered Metal Dense Reinforcing Layer (mm) | Porosity of the Spongy Sintered Metal Layer (% by vol.) | Porosity of the Sintered metal Dense Reinforcing Layer (% by vol.) | Thickness Ratio of the Sintered Metal Layers with Respect to the Composite Sheet (%) | Tensile Strength (kgf/mm$^2$) | Specific Resistance × $10^{-6}$ (Ωm) | Whether or not Curvature is Generated | Whether or not Cracks are Generated | Whether or not Roll-Off is generated After Rolling |
|---|---|---|---|---|---|---|---|---|---|---|
| Present Invention | | | | | | | | | | |
| 4 | 0.4 | 0.05 | 97 | 32 | 1.2 | 2.5 | 1.7 | No | No | No |
| 5 | 0.4 | 0.1 | 97 | 32 | 1.2 | 2.9 | 1.2 | No | No | No |
| 6 | 0.4 | 0.15 | 97 | 32 | 1.2 | 3.1 | 3.1 | No | No | No |
| Conventional Ex. | | | | | | | | | | |
| 3 | 0.4 | — | 97 | — | 1.2 | Cannot be measured because of cracks | 9.5 | No | Yes | Yes |
| 4 | 0.4 | — | 97 | — | — | 0.08 | 9.5 | No | No | — |

From the results shown in Table 6, it is clear that all of the composite sheets of the present invention 4–6 can be used as a material for producing a filter for high temperature use, a filter for use as an air cleaner, and as an electrode substrate for a secondary alkaline battery. However, since cracks were generated in the spongy sintered metal layer of conventional composite sheet 3, the sheet could not be used as a material for producing a filter for high temperature use, a filter for an air cleaner, or for an electrode substrate of a secondary alkaline battery. Moreover, since the spongy sintered metal sheet of the conventional Example 4 has a low strength, it cannot be used as a filter for high temperature use or as a filter for an air cleaner. Furthermore, since the sheet has a large specific resistance, good results were not obtained upon use as an electrode substrate for a secondary alkaline battery.

Embodiment 3

A thinner was prepared in a compositional ratio as shown in Table 7. Then, a filler is added thereto and the combined materials were kneaded in a sealed container for 8 hours to produce a slurry. The slurry was formed by a conventional doctor blade method, and dried by natural seasoning. The sheet was slit in a 4 mm width so as to produce a longitudinal, dense reinforcing green tape having a thickness of 0.1 mm and a width of 4 mm, having a 0% porosity.

TABLE 7

| | |
|---|---|
| Filler | 50.0% by weight of Ni powders having 2 μm average particle size |
| Thinner | 4.0% by weight of polyvinyl butyral |
| | 4.0% by weight of dibutyl phthalate |
| | 12.0% by weight of toluene |
| | 30.0% by weight of ethanol |

A filler and a thinner in the amounts shown in Table 7 were kneaded for 24 hours. A surfactant was added thereto and the resulting material was kneaded under a reduced pressure for 15 minutes. A foaming agent was added thereto and kneaded under atmospheric pressure for 5 minutes in order to prepare a foaming slurry.

TABLE 8

| | |
|---|---|
| Filler | 54.7% by weight of Ni powder having a 2 μm average particle size |
| Thinner | 3.7% by weight of hydroxypropyl methyl cellulose<br>3.6% by weight of glycerol<br>29.2% by weight of water |
| Surfactant | 7.3% by weight of sodium dodecylbenzene sulfonate foaming agent |
| Foaming Agent | 1.5% by weight of hexane |

The above-mentioned dense reinforcing green tape was applied onto a carrier sheet with a 6 cm interval as shown in FIG. 5. The foaming slurry was formed into a sheet on the above-mentioned Harrier sheet, with the dense reinforcing green tape placed thereon by the doctor blade method in a 0.4 mm blade gap and 0.4 mm/minute feeding speed. The applied material was foamed to a sponge-like state utilizing the vapor pressure of a volatile organic solvent and the foamability of the surfactant present in the foaming slurry at 40° C., 90% humidity and 20 minutes maintenance condition. The sheet was dried by hot air drying at 80° C. for 15 minutes in order to produce a composite green sheet comprising a dense reinforcing green tape and a spongy green layer on one side.

While passing the composite green sheet through a degreasing device (not illustrated), the sheet was degreased at 600° C. for 30 minutes in the air. The sheet was sintered in an atmosphere of $N_2$-5%$H_2$ at 1100° C. for 30 minutes while the sheet was passed through a sintering furnace (not illustrated), in order to produce a composite sheet of the present invention 7, comprising a sintered, dense metal reinforcing layer. The composite sheet of the present invention 7 was cut into the JIS Z2201 (metal material tensile test piece) No. 13A shape by an electric discharge machine in order to produce a tensile test piece having a sintered, dense metal reinforcing layer and a tensile test piece not having a sintered, dense metal reinforcing layer. With the tensile test pieces, a tensile test was conducted. The results are shown in Table 9.

TABLE 9

| Kind | Tensile strength (kg/mm²) |
|---|---|
| Tensile test piece having a sintered dense metal reinforcing layer on one side | 2.07 |
| Tensile test piece having a sintered, dense reinforcing layer on the inside | 2.07 |
| Tensile test piece not having a sintered dense metal reinforcing layer | 0.12 |

From the results shown in Table 9, it is clear that the tensile strength of a spongy porous metal sheet can be improved dramatically by the provision of a sintered, dense metal reinforcing layer.

Embodiment 4

The composite sheet of the present invention obtained in Embodiment 3 was cut by an electric discharge machine in order to produce an electrode substrate of a secondary alkaline battery of the present invention comprising a sintered, dense metal reinforcing layer with a configuration shown in FIG. 9. The obtained electrode substrate of the secondary alkaline battery of the present invention was filled with an active material mainly containing nickel hydroxide. The electrode substrate was pressed by rolling with 50% draft. The average active material filling density of the entire material, including the sintered, dense metal reinforcing layer was measured. The results are shown in Table 10.

Figure 12:
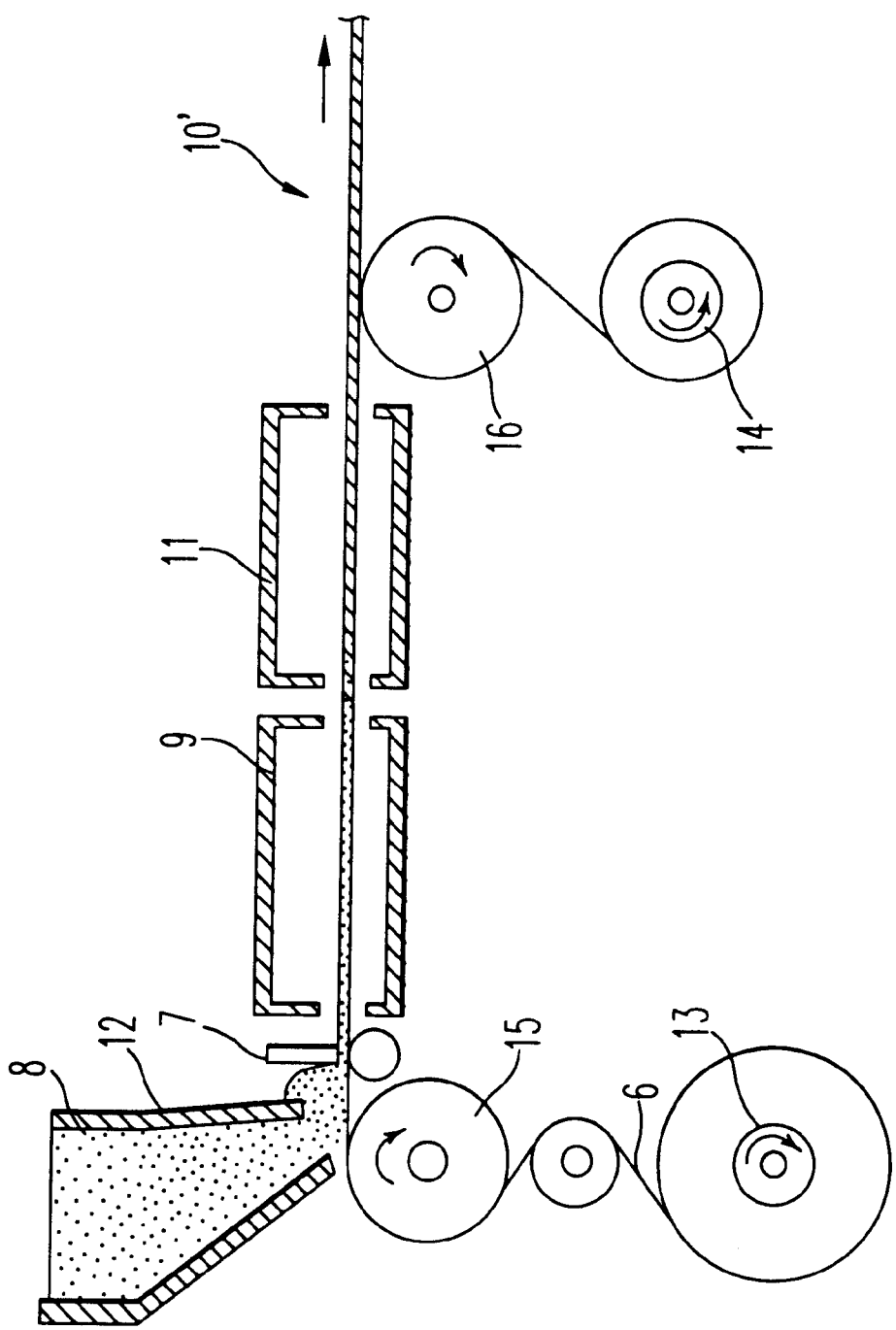
FIG. 12 is a cross-sectional diagram of a device for producing a composite green sheet to be used in the production of a conventional spongy porous metal sheet.

For purposes of comparison, with the foaming slurry shown in Table 8 and a device shown in FIG. 12, a spongy green sheet was produced under the same conditions of Embodiment 3. By degreasing the spongy green sheet and drying the sheet under the same conditions as described in Embodiment 3, a spongy porous metal sheet was produced. The spongy porous metal sheet was bonded to a nickel tape by resistance welding. The spongy, porous metal sheet bonded to the nickel tape was cut with an electric discharge machine so as to produce a conventional electrode substrate of a secondary alkaline battery. The obtained conventional electrode substrate of a secondary alkaline battery was filled with an active material mainly containing nickel hydroxide. The substrate was pressed by rolling with a 50% draft. The average active material filling density of the entire material including the nickel tape was measured. The results are shown in Table 10.

TABLE 10

| Kind | Average active material filling density in its entirety |
|---|---|
| Electrode substrate of a secondary battery according to the present invention | 2.01 |
| Conventional electrode substrate of a secondary alkaline battery | 1.93 |

As is clear from the results shown in Table 10, the electrode substrate of a secondary alkaline battery of the present invention, produced from a spongy porous metal sheet prepared by the method of the present invention can have an average active material filling density 4% thicker than that of a conventional electrode substrate of a secondary alkaline battery.

Embodiment 5

Dense reinforcing layer forming slurries A–E, having the compositions shown in Table 11 and foaming slurries A–E with the compositions shown in Table 12 were produced.

TABLE 11

| Dense Reinforcing Layer Forming Slurry | Kind of Powder Material | Composition Ratio of the Dense Reinforcing Layer Forming Slurry (% by wt.) | | | |
|---|---|---|---|---|---|
| | | Material Powders | Hydroxypropyl Methyl Cellulose | Glycerol | Water |
| A | Ni Alloy with a 9 μm Average Particle Size (INCONEL 600) Powder | 42.4 | 3.8 | 3.8 | Remainder |
| B | Cu Powder with a 10 μm Average Particle Size | 66.0 | 2.9 | 2.9 | Remainder |
| C | Cu Alloy with a 9 μm Average Particle Size (Cu-10% Ni) Powder | 47.3 | 3.8 | 3.8 | Remainder |
| D | Fe Powder with a 10 μm Average Particle Size | 56.2 | 3.6 | 3.6 | Remainder |
| E | SUS310 Powder with a 9 μm Average Particle Size | 56.2 | 3.6 | 3.6 | Remainder |

TABLE 12

Composition Ratio of the Foaming Slurry (% by wt.)

| Forming Slurry | Powder Materials Kind of Powder Material | | Hydroxypropyl Methyl Cellulose | Glycerol | Surfactant | Hexane | Water |
|---|---|---|---|---|---|---|---|
| A | Ni Alloy with a 9 μm Average Particle Size (INCONEL 600) Powder | | 45.0 | 4.0 | 4.0 | 4.0 | 1.8 | Remainder |
| B | Cu Powder with a 10 μm Average Particle Size | | 68.0 | 3.0 | 3.0 | 2.0 | 1.0 | Remainder |
| C | Cu Alloy with a 9 μm Average Particle Size (Cu - 10% Ni) Powder | 50.0 | 4.0 | 4.0 | 4.0 | 1.5 | Remainder |
| D | Fe Powder with a 10 μm Average Particle Size | | 60.0 | 3.8 | 3.8 | 4.5 | 1.8 | Remainder |
| E | SUS310 Powder with a 9 μm Average Particle Size | | 60.0 | 3.8 | 3.8 | 4.5 | 1.8 | Remainder |

A dense reinforcing layer forming slurry A shown in Table 11 was stored in hopper 12 along with a foaming slurry A, shown in Table 11. The dense reinforcing layer forming slurry A was extended onto carrier sheet 6 of FIG. 6 with a 0.2 mm blade gap in order to form a dense reinforcing slurry layer 24. By passing the slurry layer through the high temperature, high humidity vessel 9' for drying at 30° C. for 2 minutes, the surface was lightly dried. The slurry was supplied from the bottom of hopper 12, which stores the foaming slurry A, as shown in Table 12, for applying the foaming slurry A with a 0.5 mm blade gap in order to produce a laminated slurry. The laminated slurry was supplied to the high temperature, high humidity vessel 9 of FIG. 6 for foaming at 40° C. and 90% humidity for 20 minutes. Then, the slurry was dried with hot air at 80° C. for 15 minutes in order to produce a composite green sheet comprising a dense reinforcing green layer and a spongy green layer.

While passing the composite green sheet through a degreasing furnace (not illustrated), it was degreased under the conditions shown in Table 13. The green sheet was sintered under the conditions shown in Table 13, while passing the sheet through a sintering furnace (not illustrated) in order to produce a composite sheet of the present invention 8, comprising a spongy sintered metal layer and a sintered, dense metal reinforcing layer shown in Table 14.

On the composite sheet of the present invention 8 accordingly obtained, as in embodiment 1, the porosity of the spongy sintered metal layer and the sintered, dense metal reinforcing layer, the thickness ratios thereof, whether or not curvature is generated, and whether or not cracks are generated in the spongy sintered metal layer, were observed. The results are shown in Table 14.

Similarly to the dense reinforcing layer forming slurry A and the foaming slurry A of Table 12, composite green sheets were produced for the cases of a dense reinforcing layer forming slurry B of Table 11 and a foaming slurry B of Table 12, a dense reinforcing layer forming slurry C of Table 11 and a foaming slurry C of Table 12, a dense reinforcing layer forming slurry D of Table 11 and a forming slurry 8 of Table 12, and a dense reinforcing layer forming slurry E of Table 11 and a foaming slurry E of Table 12. The composite green sheets were degreased while passing through a degreasing furnace (not illustrated) under the conditions shown in Table 13. Thereafter, the sheets were sintered by passing through sintering furnace (not illustrated). Sintering conditions are shown in Table 13, and each of the produced composite sheets of the present invention 9–12 comprised a spongy sintered metal layer and a sintered, dense metal reinforcing layer shown in Table 14.

On the composite sheets of the present invention 9–12 accordingly obtained, as in the Embodiment 1, whether or not curvature is generated, and whether or not cracks are generated in the spongy sintered metal layer, were observed. The results are shown in Table 14.

TABLE 13

| | Degreasing Condition | | | Sintering Conditions Sintering | | |
|---|---|---|---|---|---|---|
| Laminated Plate | Atmosphere | Temperature (° C.) | Time (min) | Atmosphere | Temperature (° C.) | Time (min) |
| Ex. of Invention | | | | | | |
| 8 | Vacuum | 700 | 60 | Vacuum | 1050 | 15 |
| 9 | In the air | 600 | 20 | 5% H$_2$—N$_2$ | 1050 | 15 |
| 10 | In the air | 600 | 20 | 5% H$_2$—N$_2$ | 1050 | 15 |
| 11 | Vacuum | 700 | 60 | 5% H$_2$—N$_2$ | 1050 | 15 |
| 12 | Vacuum | 700 | 60 | Vacuum | 1050 | 15 |

TABLE 14

| Laminated Plate Example | Porosity of spongy annealing metal layer (vol. %) | Porosity of reinforcing layer with minute annealing metal (vol. %) | Thickness rate of reinforcing layer with minute annealing metal to one of laminated plate (%) | Curvature | Cracks |
|---|---|---|---|---|---|
| 8 | 97 | 20 | 12 | No | No |
| 9 | 90 | 0 | 5 | No | No |
| 10 | 96 | 2 | 5 | No | No |
| 11 | 95 | 4 | 6 | No | No |
| 12 | 95 | 10 | 8 | No | No |

From the results shown in Table 14, it is clear that, since the composite sheets of the present invention 9–12 do not curve, and, furthermore, do not generate cracks in the spongy sintered metal layer, they can be used as a material for producing a filter for high temperature use and a filter for an air cleaner.

As heretofore mentioned, in the present invention, a high strength spongy, sintered metal composite sheet comprising a sintered, dense metal reinforcing layer for strengthening on one side or in the inside of a spongy sintered metal layer with a high porosity can be produced. The high strength spongy sintered metal composite sheet can be used as a material for producing various kinds of filters and as an electrode substrate of a secondary alkaline battery. Since an electrode substrate of a secondary alkaline battery obtained by using the high strength spongy sintered metal composite sheet have an increased active material average filling density in comparison to conventional sheets, and a low resistance so as to improve the collecting efficiency, the present invention can contribute significantly to the development of the secondary alkaline battery industry.

The disclosures of priority Japanese Application Nos. 10-095870 and 11-046564 filed Apr. 8, 1998 and Feb. 24, 1999 are hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is intended to be secured by Letters Patent is:

1. A high strength spongy sintered metal composite sheet comprising a laminate of
   at least one porous, spongy, sintered metal layer having continuous holes, which are open to the surface of the at least one porous, spongy sintered metal layer and which are continuous with internal holes of the metal of the at least one porous, spongy sintered metal layer; and
   at least one sintered, dense metal reinforcing layer having a porosity less than the porosity of the at least one porous, spongy, sintered metal layer, wherein the laminate is a single body having a continuous sintered structure.

2. The composite sheet according to claim 1, wherein the laminate comprises
   one sintered, dense metal reinforcing layer; and
   one porous, spongy, sintered metal layer having continuous holes laminated directly on the one sintered, dense metal reinforcing layer.

3. The composite sheet according to claim 1, wherein the laminate comprises
   one sintered, dense metal reinforcing layer; and
   first and second porous, spongy, sintered metal layers having continuous holes laminated, respectively, on opposite sides of the one sintered, dense metal reinforcing layer.

4. The composite sheet according to claim 1, wherein the porous, spongy, sintered metal layer and the sintered, dense metal reinforcing layer comprise a sintered metal prepared by sintering Ni powders.

5. A secondary alkaline battery electrode substrate comprising the composite sheet of claim 4.

6. A filter comprising the composite sheet of claim 4.

7. A method of producing a composite sheet, the method comprising extending on a first carrier a first slurry comprising a metal powder;
   heating and drying the first slurry to form a first green layer;
   extending on a second carrier a second slurry comprising the metal powder and a foaming agent;
   heating and drying the second slurry to form a second green layer;
   sintering the first green layer;
   sintering the second green layer; and
   forming the composite sheet of claim 1.

8. The method according to claim 7, wherein the second carrier comprises the first green layer.

9. A high strength spongy sintered metal composite sheet comprising a laminate of
   at least one porous, spongy, sintered metal layer having continuous holes, which are open to the surface of the at least one porous, spongy sintered metal layer and which are continuous with internal holes of the metal of the at least one porous, spongy sintered metal layer; and
   at least one sintered, dense metal reinforcing layer comprising a material having a porosity less than the porosity of the at least one porous, spongy, sintered metal layer, wherein
      the at least one sintered, dense metal reinforcing layer includes a plurality of holes each having an axis substantially parallel to a thickness of the at least one sintered, dense metal reinforcing layer; and
      the at least one porous, spongy, sintered metal layer extends into the plurality of holes in the at least one sintered, dense metal reinforcing layer.

10. A method of producing a composite sheet, the method comprising
    extending on a first carrier a first slurry comprising a metal powder;
    heating and drying the first slurry to form a first green layer;
    extending on a second carrier a second slurry comprising the metal powder and a foaming agent;
    heating and drying the second slurry to form a second green layer;
    sintering the first green layer;
    sintering the second green layer; and
    forming the composite sheet of claim 9.

11. The method according to claim 10, wherein the second carrier comprises the first green layer.

12. A high strength spongy sintered metal composite sheet consisting of a laminate of
    a porous, spongy, sintered metal layer having continuous holes, which are open to the surface of the porous, spongy, sintered metal layer and which are continuous with internal holes of the metal of the porous, spongy, sintered metal layer; and
    a sintered, dense metal reinforcing layer having a porosity less than the porosity of the porous, spongy, sintered metal layer, wherein
       the laminate is made as one body having a continuous skeleton structure on a boundary surface with the dense metal reinforcing layer by sintering a laminated slurry sheet.

13. The composite sheet of claim 12, wherein
    the porous, sintered metal layer has a porosity of 70–99 vol%; and
    the sintered dense metal reinforcing layer has a porosity of 4–55 vol%.

* * * * *

UNITED STATES PATENT AND TRADEMARK OFFICE
CERTIFICATE OF CORRECTION

PATENT NO.     : 6,423,422 B2
DATED          : July 23, 2002
INVENTOR(S)    : Wada et al.

It is certified that error appears in the above-identified patent and that said Letters Patent is hereby corrected as shown below:

<u>Title page,</u>
The CPA information has been omitted. Item [45] and the Notice information should read as follows:

-- [45] **Date of Patent: *Jul. 23, 2002**

[*]  Notice: This patent issued on a continued porsecution application filed under 37 CFR 1.53(d), and is subject to the twenty year patent term provisions of U.S.C. 154(a) (2).

Subject to any disclaimer, the term of this patent is extended or adjusted under 35 U.S.C. 154(b) by 0 days. --

Signed and Sealed this

Twenty-fourth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO.   : 6,423,422 B2                                       Page 1 of 1
DATED        : July 23, 2002
INVENTOR(S)  : Wada et al.

It is certified that error appears in the above-identified patent and that said Letters Patent is hereby corrected as shown below:

<u>Title page,</u>
The CPA information has been omitted. Item [45] and the Notice information should read as follows:
-- [45]  **Date of Patent: \*Jul. 23, 2002**

-- [\*]   Notice:  This patent issued on a continued prosecution
                  application filed under 37 CFR 1.53(d), and is
                  subject to the twenty year patent term provisions
                  of U.S.C. 154(a) (2).

Subject to any disclaimer, the term of this
                  patent is extended or adjusted under 35
                  U.S.C. 154(b) by 0 days. --

This certificate supersedes Certificate of Correction issued December 24, 2002.

Signed and Sealed this

Eighteenth Day of February, 2003

JAMES E. ROGAN
*Director of the United States Patent and Trademark Office*